United States Patent
Xu et al.

(10) Patent No.: US 12,363,631 B2
(45) Date of Patent: Jul. 15, 2025

(54) CELL RESELECTION METHOD, APPARATUS AND SYSTEM FOR SIDELINK COMMUNICATION

(71) Applicant: ZTE CORPORATION, Shenzhen (CN)

(72) Inventors: Hui Xu, Shenzhen (CN); Jinli Meng, Shenzhen (CN); Chen Lu, Shenzhen (CN); Xiangmo Zhao, Shaanxi (CN); Fei Hui, Shaanxi (CN)

(73) Assignee: ZTE CORPORATION, Shenzhen (CN)

( * ) Notice: Subject to any disclaimer, the term of this patent is extended or adjusted under 35 U.S.C. 154(b) by 453 days.

(21) Appl. No.: 17/640,770

(22) PCT Filed: May 9, 2020

(86) PCT No.: PCT/CN2020/089334
§ 371 (c)(1),
(2) Date: Mar. 4, 2022

(87) PCT Pub. No.: WO2021/042758
PCT Pub. Date: Mar. 11, 2021

(65) Prior Publication Data
US 2022/0312291 A1    Sep. 29, 2022

(30) Foreign Application Priority Data

Sep. 4, 2019 (CN) .......................... 201910833916.8

(51) Int. Cl.
*H04W 48/20* (2009.01)
(52) U.S. Cl.
CPC ................ *H04W 48/20* (2013.01)

(58) Field of Classification Search
CPC ....... H04W 36/24; H04W 36/08; H04W 4/40; H04W 48/20; H04W 76/23; H04W 76/19; H04W 76/02
See application file for complete search history.

(56) References Cited

U.S. PATENT DOCUMENTS

2012/0094679 A1 * 4/2012 Rao ...................... H04W 48/16
455/450
2019/0222367 A1   7/2019 Tseng et al.
(Continued)

FOREIGN PATENT DOCUMENTS

| CN | 106879009 A | 6/2017 |
| CN | 109996332 A | 7/2019 |

(Continued)

OTHER PUBLICATIONS

International Search Report for Application No. PCT/CN2020/089334, dated Jul. 29, 2020, 4 pages including English translation.
(Continued)

*Primary Examiner* — Michael A Keller
*Assistant Examiner* — Thao D Duong
(74) *Attorney, Agent, or Firm* — Morgan, Lewis & Bockius LLP

(57) ABSTRACT

Provided are a cell reselection method, apparatus, and system for sidelink communication. The cell reselection method for sidelink communication includes the following. A UE in an inactive state and participating in the sidelink communication receives cell reselection information, where the cell reselection information includes cell reselection information for implementing service continuity of the sidelink communication. The UE performs cell reselection according to the cell reselection information and capability information of the UE.

19 Claims, 8 Drawing Sheets

(56) References Cited

U.S. PATENT DOCUMENTS

| | | | |
|---|---|---|---|
| 2020/0170002 A1* | 5/2020 | Lee | H04W 72/0453 |
| 2021/0195678 A1* | 6/2021 | Jin | H04W 60/04 |
| 2022/0094481 A1* | 3/2022 | Hong | H04L 1/1812 |
| 2022/0174568 A1* | 6/2022 | Lu | H04W 36/08 |
| 2022/0201790 A1* | 6/2022 | Jung | H04W 4/40 |
| 2023/0037084 A1* | 2/2023 | Jung | H04W 4/40 |

FOREIGN PATENT DOCUMENTS

| | | |
|---|---|---|
| CN | 110536368 A | 12/2019 |
| WO | WO-2019137337 A1 | 7/2019 |

OTHER PUBLICATIONS

Oppo, "Discussion on Inter-RAT Control", *3GPP TSG-RAN WG2 Meeting* #106 R2-1905567, May 17, 2019 (May 17, 2019), section 2.

ZTE et al., "Service sensitive cell selection and reselection in NR", *3GPP TSG-RAN WG2*#97 R2-1701388, Feb. 17, 2017 (Feb. 17, 2017), entire document.

Supplementary European Search Report for Application No. 20859705, dated Aug. 9, 2023, 15 pages.

Fraunhofer HHI et al., "Evaluation of NR V2X Mode 2 Resource Allocation", 3GPP TSG RAN WG1 #96, R1-1901844, Athens Greece, Feb. 25, 2019.

ZTE, :Consideration on exceptional resource pool for NR V2X, 3GPP TSG-RAN WG2#107, R2-1909075, Prague, Czech Republic, Aug. 26, 2019.

InterDigital Inc., "TP to TR 38.885 on MultiRAT CP Aspects in V2X V2X", 3GPP RAN WG2 Meeting #105, R2-1901577, Athens, Greece, Feb. 25, 2019.

Ericcson, "Analysis of NR Uu features for eV2X", 3GPP TSG-RAN WG2 #104, TDoc R2-1817947, Spokane, WA, USA, Nov. 12, 2018.

Chinese Search Report for Application No. 2019108339168, dated Jun. 18, 2024, 4 pages including translation.

Chinese Office Action for Application No. 2019108339168, dated Jun. 21, 2024, 12 pages including translation.

KDDI Corporation et al., "Speed dependent cell reselection priority", 3GPP TSG-RAN WG2 Meeting #103bis, R2-1813623 (Revision of R2-1811277), Chengdu, China, Oct. 8-12, 2018.

Ericsson, "Scaling of cell reselection parameters based on mobility", 3GPP TSG-RAN2 Meeting #104, R2-1817139, Spokane, USA, Nov. 12-16, 2018.

Supplemental Search Report in Chinese Application No. 2019108339168 dated Sep. 24, 2024, 5 pages, including translation.

Notice of Rejection in Chinese Application No. 2019108339168 dated Sep. 28, 2024, 14 pages, including translation.

* cited by examiner

CELL RESELECTION METHOD, APPARATUS AND SYSTEM FOR SIDELINK COMMUNICATION

CROSS-REFERENCE TO RELATED APPLICATION(S)

This is a national stage application filed under 37 U.S.C. 371 based on International Patent Application No. PCT/CN2020/089334, filed May 9, 2020, which claims priority to Chinese Patent Application No. 201910833916.8 filed with the China National Intellectual Property Administration (CNIPA) on Sep. 4, 2019, the disclosures of which are incorporated herein by reference in their entireties.

TECHNICAL FIELD

The present application relates to a wireless communication network, for example, a cell reselection method, apparatus, and system for sidelink communication.

BACKGROUND

In 5G New Radio (5G NR), a device-to-device (D2D) communication mode is provided. That is, a communication connection can be directly established between user equipments (UEs) for communication therebetween without the participation of a base station or another access node. D2D communication includes multiple types of communication, for example, vehicle-to-everything (V2X) communication.

In 5G NR, three radio resource control (RRC) states of a UE are defined, which include an idle state, an inactive state, and a connected state. The idle state and the inactive state are similar and differ in that in the inactive state, a UE context, a non-access stratum (NAS) connection, and an NG interface connection are retained in the UE, a base station, and a core network. A UE in the inactive state enters the connected state through an RRC connection resume procedure.

In D2D communication, especially V2X communication, the UE may move at a high speed. Therefore, the UE will perform cell reselection or cell handover. During the cell reselection or cell handover, the UE needs to ensure service continuity through a mobility management mechanism. However, there is no corresponding mobility management mechanism about how to ensure the service continuity during the cell reselection or cell handover of the UE in the inactive state. Therefore, the service continuity of the UE may be affected.

SUMMARY

The present application provides a cell reselection method, apparatus, and system for sidelink communication, which can ensure service continuity of sidelink communication performed by a UE.

Embodiments of the present application provide a cell reselection method for sidelink communication. The method includes the following.

A UE in an inactive state and participating in the sidelink communication receives cell reselection information, where the cell reselection information includes cell reselection information for implementing service continuity of the sidelink communication.

The UE performs cell reselection according to the cell reselection information and capability information of the UE.

Embodiments of the present application provide a cell reselection method for sidelink communication. The method includes the following.

A base station providing the sidelink communication configures cell reselection information, where the cell reselection information includes cell reselection information for implementing service continuity of the sidelink communication.

The base station sends the cell reselection information.

Embodiments of the present application provide a cell reselection apparatus for sidelink communication, which is disposed in a UE in an inactive state and participating in the sidelink communication. The cell reselection apparatus for sidelink communication includes a receiving module and a reselection module.

The receiving module is configured to receive cell reselection information, where the cell reselection information includes cell reselection information for implementing service continuity of the sidelink communication.

The reselection module is configured to perform cell reselection according to the cell reselection information and capability information of the UE.

Embodiments of the present application provide a cell reselection apparatus for sidelink communication, which is disposed in a base station providing the sidelink communication. The cell reselection apparatus for sidelink communication includes a configuration module and a sending module.

The configuration module is configured to configure cell reselection information, where the cell reselection information includes cell reselection information for implementing service continuity of the sidelink communication.

The sending module is configured to send the cell reselection information.

Embodiments of the present application provide a cell reselection system for sidelink communication. The cell reselection system for sidelink communication includes a UE and a base station, where the UE is in an inactive state and the base station provides the sidelink communication.

The UE includes the cell reselection apparatus for sidelink communication described above.

The base station includes the cell reselection apparatus for sidelink communication described above.

DETAILED DESCRIPTION

Embodiments of the present application are described hereinafter in detail in conjunction with the drawings.

D2D communication is a communication mode in which UEs directly communicate with each other. The D2D communication includes multiple types of communication such as V2X communication. In the following embodiments of the present application, a cell reselection method for sidelink communication provided by the embodiments of the present application is described using the V2X communication as an example.

Figure 1:
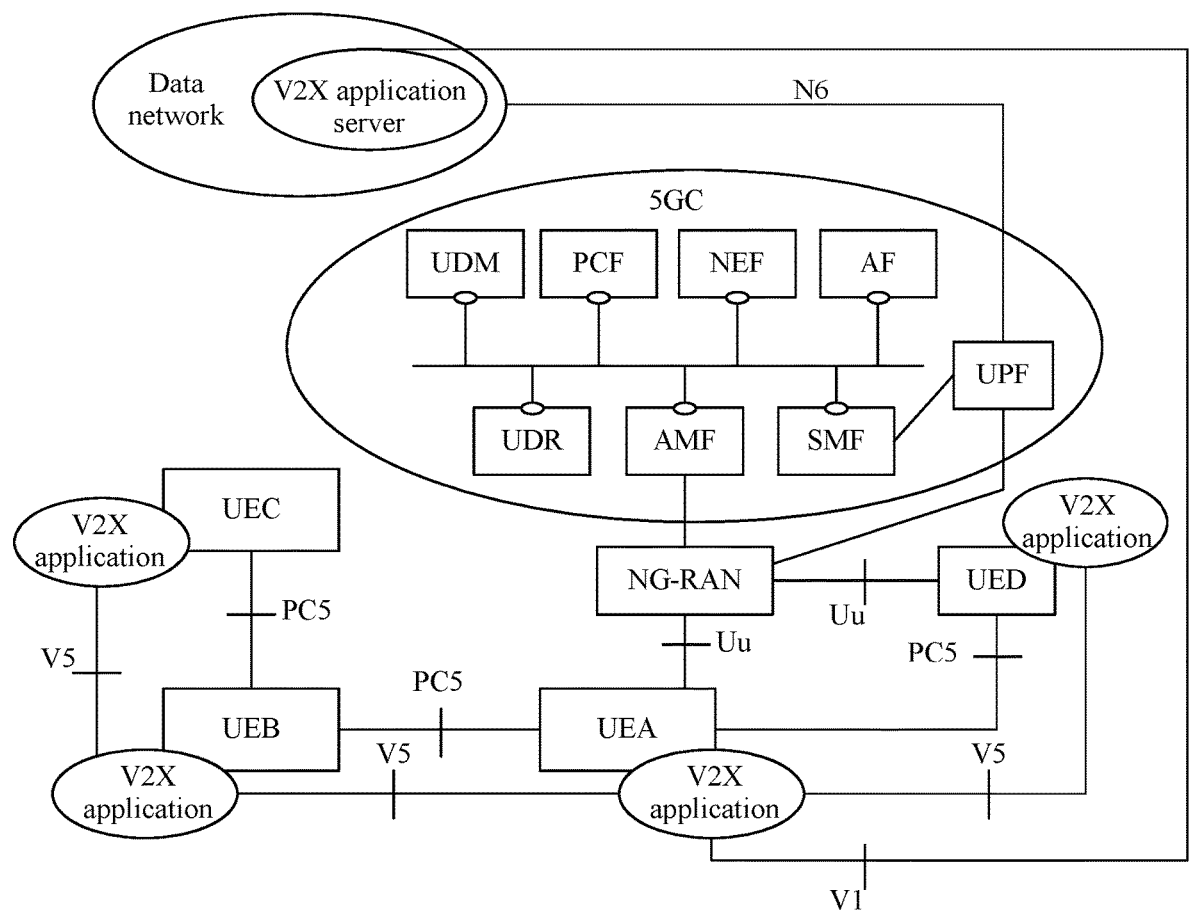
FIG. 1 is a schematic diagram illustrating architecture of a system for sending V2X service through a PC5 interface.

In 5G NR, the V2X technology includes that V2X may be implemented through a PC5 interface or a Uu interface, where the PC5 interface refers to an air interface of D2D and the Uu interface refers to an air interface from a UE to a next-generation NodeB (gNB). As shown in FIG. 1 which is a schematic diagram illustrating architecture of a system for sending V2X service through a PC5 interface, a 5G core (5GC) includes multiple network elements, and each UE accesses the network through a next-generation radio access network (NG-RAN).

NR V2X supports a unicast transmission, a groupcast transmission, and a broadcast transmission, all of which may be implemented within coverage, within partial coverage, or out of coverage. An NR V2X transmission includes mode 1 and mode 2, where mode 1 refers to that the gNB configures a PC5 resource for transmitting the V2X service and mode 2 refers to that the UE autonomously selects the PC5 resource for transmitting the V2X service.

Figure 2:
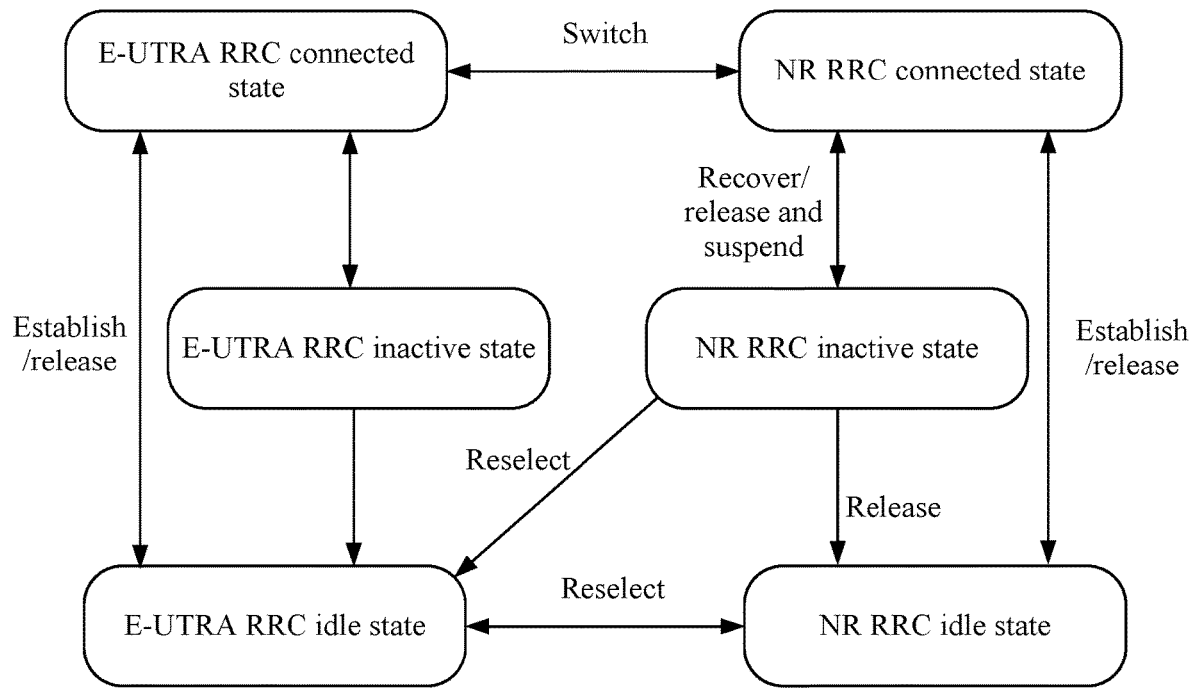
FIG. 2 is a schematic diagram illustrating that a UE switches between different states.

In 5G NR, three RRC states of the UE are defined: an idle state, an inactive state, and a connected state. The idle state and the inactive state are similar and differ in that in the inactive state, a UE context, an NAS connection, and an NG interface connection are retained in the UE, the gNB, and the 5GC. A UE in the inactive state enters the connected state through an RRC connection resume procedure. FIG. 2 is a schematic diagram illustrating that a UE switches between different states. RRC states in both an Evolved Universal Mobile Telecommunications System (UMTS) Terrestrial Radio Access Network (E-UTRAN) and an NR network include an RRC connected state (RRC CONNECTED), an RRC inactive state (RRC INACTIVE), and an RRC idle state (RRC IDLE). Various states may be switched to each other. The UE in the inactive state is allowed to move within a certain range without notifying the network. The movement range is defined as a radio access network (RAN)-based notification area (RNA). Generally, the RNA is larger than or equal to one cell and smaller than or equal to one tracking area (TA). In addition, a valid area of a system message is defined in NR. The valid area may include one or more cells. When the UE moves within the same valid area of the system message, it is unnecessary to initiate a cell reselection or cell handover procedure.

In the D2D communication, especially the V2X communication, the UE may move at a high speed. Therefore, the UE will perform cell reselection or cell handover. During the cell reselection or cell handover, the UE needs to ensure service continuity through a mobility management mechanism. However, there is no corresponding mobility management mechanism about how to ensure the service continuity during the cell reselection or cell handover of the UE in the inactive state. Therefore, the service continuity of the UE may be affected.

Figure 3:
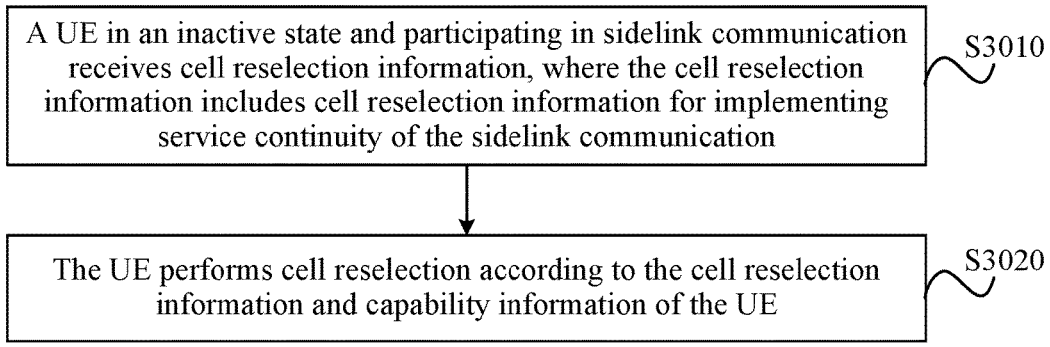
FIG. 3 is a flowchart of a cell reselection method for sidelink communication according to an embodiment.

FIG. 3 is a flowchart of a cell reselection method for sidelink communication according to an embodiment. As shown in FIG. 3, the method provided by this embodiment includes the following.

In S3010, a UE in an inactive state and participating in the sidelink communication receives cell reselection information, where the cell reselection information includes cell reselection information for implementing service continuity of the sidelink communication.

The cell reselection method for sidelink communication provided by this embodiment is applied to a UE in a wireless communication system, and the UE is in the inactive state and participates in the sidelink communication. The inactive state is one state of the UE. The UE in the inactive state has registered in a cell. However, when the UE does not transmit communication data, merely part of connection information is stored so as to save power. The UE needs to enter the connected state through an RRC connection resume procedure and then continues to transmit communication data. In D2D communication, communication between UEs is referred to as the sidelink communication and uses a dedicated resource allocated for the sidelink communication. The UE in the inactive state may be a UE which is performing the sidelink communication or a UE which is to perform the sidelink communication, both of which are referred to as the UE in the inactive state and participating in the sidelink communication. No matter which kind of UE in the inactive state, the UE may need to perform cell reselection during movement or because of poor signal quality of a source cell. That is, the UE reselects a cell where the sidelink communication can be continued. To ensure the service continuity of the UE in the inactive state and participating in the sidelink communication, a base station needs to configure, for the sidelink communication, the cell reselection information for implementing the service continuity of the sidelink communication. The base station may send the cell reselection information through system information or dedicated RRC signaling. The cell reselection information is broadcast information. All UEs within a cell coverage range provided by the base station can receive the cell reselection information.

The UE in the present application includes one of an on-board unit (OBU) or any other UE.

In S3020, the UE performs the cell reselection according to the cell reselection information and capability information of the UE.

Since the cell reselection information includes the cell reselection information for implementing the service continuity of the sidelink communication, the service continuity of the sidelink communication can be ensured after the UE reselects a cell for the sidelink communication according to the cell reselection information. The UE also needs to perform the cell reselection according to the capability information of the UE. That is, the UE in the inactive state and participating in the sidelink communication performs the cell reselection according to both the cell reselection information and the capability information of the UE.

The capability information of the UE includes a capability of the UE to perform the sidelink communication on the same radio access technology (RAT) and/or different RATs and an RAT type that allows the UE to perform the sidelink communication. Many UEs in the D2D communication do not have all capabilities. Considering factors such as a cost, some UEs have merely part of the capabilities. For example, the sidelink communication is supported merely in part of cells of RAT types. When the UE performs the cell reselection, the UE can merely reselect cells of RAT types which support the sidelink communication or allow the sidelink communication to be performed. Then, the UE has different capabilities to perform the sidelink communication in RAT cells which support the sidelink communication. The UE may preferentially reselect an RAT cell with a better sidelink communication capability.

The cell reselection information includes a cell reselection frequency priority and sidelink communication configuration information. The UE may determine information about a reselected cell according to the cell reselection frequency priority and the sidelink communication configuration information. Different cells are differentiated according to frequencies. Frequencies used by cells may be the same or different. The cell reselection frequency priority configured by the base station indicates a priority of a frequency of a cell where the sidelink communication can be performed. The cell reselection frequency priority includes two scenarios which are an in-coverage scenario and an out-of-coverage scenario, respectively. In the in-coverage scenario, if a first frequency of a source cell of a UE in a non-connected state is a frequency at which the sidelink communication is provided, the UE uses the first frequency as a highest priority for the cell reselection. In the out-of-coverage scenario, if the UE is outside a coverage range of a cell providing the sidelink communication, the UE uses a second frequency as the highest priority for the cell reselection, where the second frequency is a frequency of a cell providing a sidelink communication resource. The sidelink communication configuration information includes sidelink resource configuration information for the sidelink communication, that is, configuration information of a resource which can be provided for the sidelink communication, which includes configuration information of any resource such as a frequency or a symbol.

In an embodiment, that the UE performs the cell reselection according to the cell reselection information and the capability information of the UE includes that the UE preferentially selects a target cell capable of providing the sidelink communication to perform the cell reselection. The target cell provides the sidelink communication at a frequency the same as or different from that of the source cell. That is to say, although the UE performs the cell reselection according to the cell reselection information and the capability information of the UE, the cell selected according to the cell reselection information may fail to provide the sidelink communication due to poor signal quality or an excessive load. Therefore, the UE will preferentially select the target cell capable of providing the sidelink communication to perform the cell reselection.

In an embodiment, the cell reselection information for implementing the service continuity of the sidelink communication includes information with which the UE that is of interest or performing the sidelink communication preferentially selects the target cell capable of providing the sidelink communication to perform the cell reselection in the case where the UE needs to perform the cell reselection. That is, to ensure the service continuity of the sidelink communication of the UE, the UE desires to preferentially reselect the target cell which can ensure the service continuity of the sidelink communication of the UE.

In an embodiment, in the case where the UE does not support the sidelink communication to be performed in a reselected cell, the UE performs the sidelink communication using a pre-configured sidelink communication resource. That is, after the UE performs the cell reselection, if the UE does not support the sidelink communication to be performed in the reselected cell or the sidelink communication cannot be performed in the reselected cell due to the poor signal quality or the excessive load, the UE may perform the sidelink communication using the pre-configured sidelink communication resource. A dedicated sidelink communication resource may be pre-configured for the sidelink communication. The UE may perform the sidelink communication using the pre-configured sidelink communication resource, thereby ensuring that the UE can perform the sidelink communication after reselection so as to ensure the service continuity of the sidelink communication.

In an embodiment, the base station may also configure an exceptional resource pool for the sidelink communication and broadcast configuration information of the exceptional resource pool for the cell reselection. After the UE receives the configuration information of the exceptional resource pool for the cell reselection, the UE performs the cell reselection according to the cell reselection information and the capability information of the UE and selects a transmission resource for the sidelink communication according to the configuration information of the exceptional resource pool. The exceptional resource pool is configured for the cell reselection so that it can be ensured that a sidelink communication resource can be available for the sidelink communication after the cell reselection and the service continuity of the sidelink communication can be further ensured.

In an embodiment, the base station may also configure, for the sidelink communication, speed-related configuration information for the cell reselection. After receiving the speed-related configuration information for the cell reselection, the UE determines corresponding speed-related configuration information according to a current motion speed and performs the cell reselection according to cell reselection information indicated by the corresponding speed-related configuration information. When the UE has an excessively high speed, the UE frequently crosses multiple cells during movement. If the UE performs the cell reselection and changes a communication resource for the sidelink communication every time the UE crosses cells, the continuity of the sidelink communication performed by the UE may be affected. Therefore, the speed-related configuration information for the cell reselection may be configured. The speed-related configuration information includes different speed-related configuration information corresponding to different movement speeds of the UE. For example, the speed-related configuration information includes a range of the RNA, a range of the valid area of the system message, or other cell reselection information. Multiple thresholds may be set for the speed of the UE. For example, when the speed of the UE exceeds a certain threshold, it is determined that the speed of the UE is high. In this case, the range of the RNA or the range of the valid area of the system message may be increased or a cell reselection procedure is speeded up so that the service continuity of the sidelink communication is improved when the UE moving at the high speed performs the cell reselection. However, when the speed of the UE is lower than a certain threshold, it may be determined that the speed of the UE is low. In this case, the range of the RNA or the range of the valid area of the system message may be reduced or the cell reselection procedure is slowed down so that service reliability of the sidelink communication is improved and the consumption of system resources is reduced when the UE performs the cell reselection.

According to the cell reselection method for sidelink communication provided by this embodiment, the UE in the inactive state and participating in the sidelink communication receives the cell reselection information which includes the cell reselection information for implementing the service continuity of the sidelink communication, and the UE performs the cell reselection according to the cell reselection information and the capability information of the UE. Since the cell reselection information includes the cell reselection information for implementing the service continuity of the sidelink communication, the service continuity of the sidelink communication can be ensured after the UE performs the cell reselection, thereby improving user experience.

Figure 4:
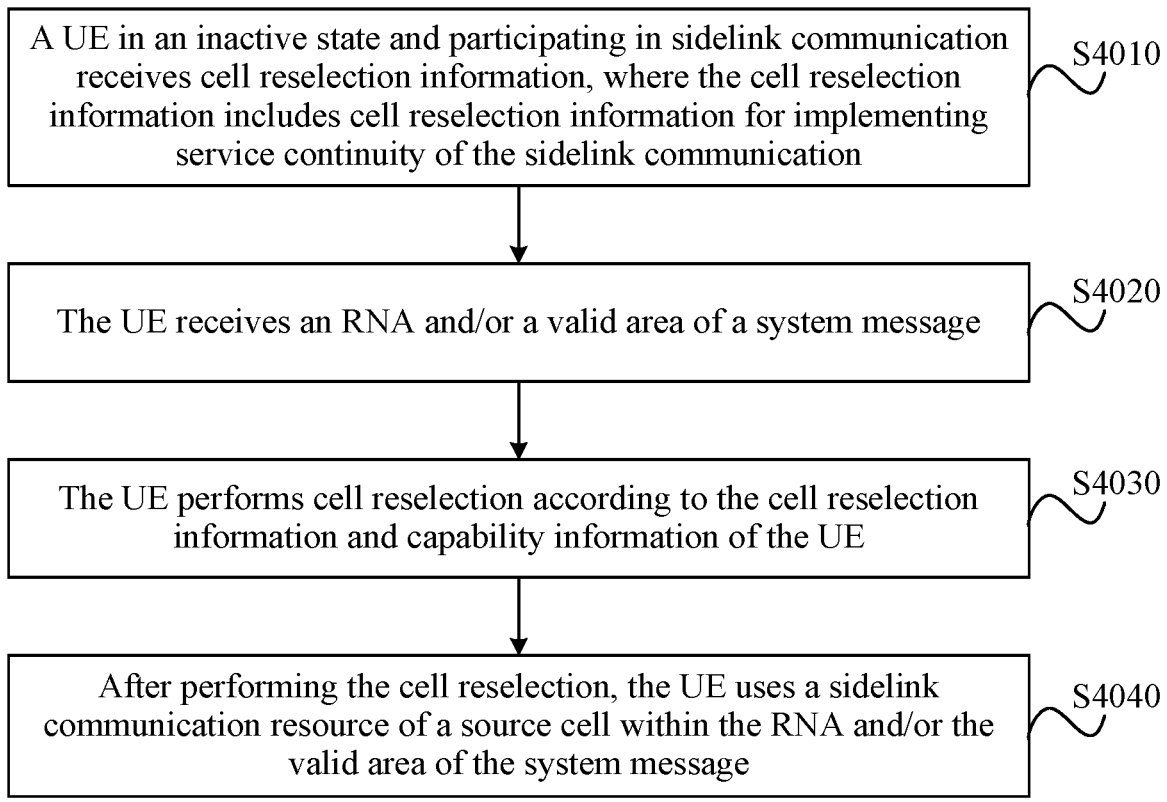
FIG. 4 is a flowchart of another cell reselection method for sidelink communication according to an embodiment.

FIG. 4 is a flowchart of another cell reselection method for sidelink communication according to an embodiment. As shown in FIG. 4, the method provided by this embodiment includes the following.

In S4010, a UE in an inactive state and participating in the sidelink communication receives cell reselection information, where the cell reselection information includes cell reselection information for implementing service continuity of the sidelink communication.

In S4020, the UE receives an RNA and/or a valid area of a system message.

In the sidelink communication, the parameter RNA exists. The UE in the inactive state moves within the range of the RNA without notifying a network. Generally, one RNA is larger than or equal to one cell. In addition, the valid area of the system message is also defined in NR. The valid area of the system message includes one or more cells. When the UE moves within the same valid area of the system message, it is unnecessary to initiate a cell reselection or cell handover procedure. The UE may receive information about the RNA and/or the valid area of the system message from information broadcast by a base station.

In S4030, the UE performs cell reselection according to the cell reselection information and capability information of the UE.

In S4040, after performing the cell reselection, the UE uses a sidelink communication resource of a source cell within the RNA and/or the valid area of the system message.

Since the UE can use an original communication resource for communication in both the RNA and the valid area of the system message, after the UE performs the cell reselection, no matter whether a cell reselected by the UE has a frequency the same as or different from that of the source cell, the UE can continue using the sidelink communication resource of the source cell for the sidelink communication within the RNA and/or the valid area of the system message. In this manner, although the UE reselects a new cell, the UE may still use an original sidelink communication resource for communication so that the interruption of service of the sidelink communication can be further avoided.

Figure 5:
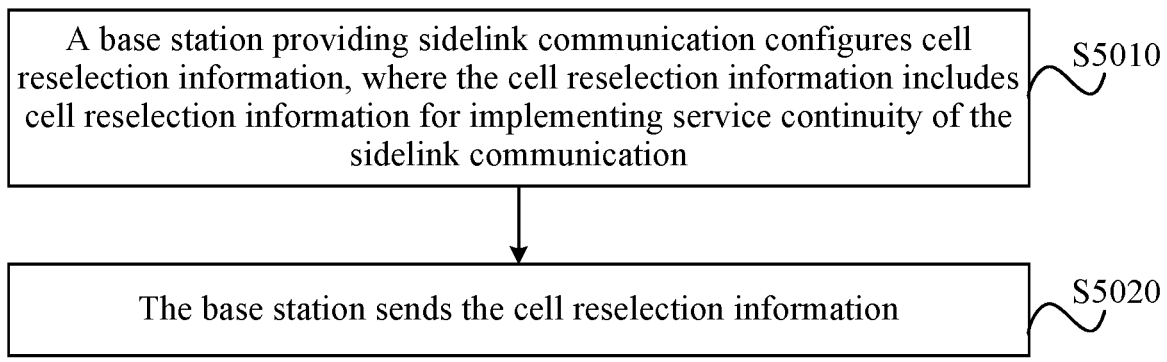
FIG. 5 is a flowchart of another cell reselection method for sidelink communication according to an embodiment.

FIG. 5 is a flowchart of another cell reselection method for sidelink communication according to an embodiment. As shown in FIG. 5, the method provided by this embodiment includes the following.

In S5010, a base station providing the sidelink communication configures cell reselection information, where the cell reselection information includes cell reselection information for implementing service continuity of the sidelink communication.

The cell reselection method for sidelink communication provided by this embodiment is applied to a base station in a wireless communication system, and the base station can provide cells for the sidelink communication. The cell reselection information configured by the base station includes the cell reselection information for implementing the service continuity of the sidelink communication. The cell reselection information is used by a UE in an inactive state and participating in the sidelink communication for cell reselection for the sidelink communication. The inactive state is one state of the UE. The UE in the inactive state has registered in a cell.

However, when the UE does not transmit communication data, merely part of connection information is stored so as to save power. The UE needs to enter the connected state through an RRC connection resume procedure and then continues to transmit communication data. In D2D communication, communication between UEs is referred to as the sidelink communication and uses a dedicated resource allocated for the sidelink communication. The UE in the inactive state may be a UE which is performing the sidelink communication or a UE which is to perform the sidelink communication, both of which are referred to as the UE in the inactive state and participating in the sidelink communication. No matter which kind of UE in the inactive state, the UE may need to perform cell reselection during movement or because of poor signal quality of a source cell. That is, the UE reselects a cell where the sidelink communication can be continued. To ensure service continuity of the UE in the inactive state and participating in the sidelink communication, the base station needs to configure, for the sidelink communication, the cell reselection information for implementing the service continuity of the sidelink communication.

The base station in the embodiment of the present application includes a road side unit (RSU). The base station further includes one of an Evolved NodeB (eNB) or a gNB.

In S5020, the base station sends the cell reselection information.

The base station may send the cell reselection information through system information or dedicated RRC signaling. The cell reselection information is broadcast information. All UEs within a cell coverage range provided by the base station can receive the cell reselection information. Since the cell reselection information includes the cell reselection information for implementing the service continuity of the sidelink communication, the service continuity of the sidelink communication can be ensured after the UE reselects the cell for the sidelink communication according to the cell reselection information. The UE also needs to perform the cell reselection according to capability information of the UE. That is, the UE in the inactive state and participating in the sidelink communication performs the cell reselection according to both the cell reselection information and the capability information of the UE.

The cell reselection information includes a cell reselection frequency priority and sidelink communication configuration information. Different cells are differentiated according to frequencies. Frequencies used by cells may be the same or different. The cell reselection frequency priority configured by the base station indicates a priority of a frequency of a cell where the sidelink communication can be performed. The cell reselection frequency priority includes two scenarios which are an in-coverage scenario and an out-ofcoverage scenario, respectively. In the in-coverage scenario, if a first frequency of a source cell of a UE in a non-connected state is a frequency at which the sidelink communication is provided, the UE uses the first frequency as a highest priority for the cell reselection. In the out-of-coverage scenario, if the UE is outside a coverage range of a cell providing the sidelink communication, the UE uses a second frequency as the highest priority for the cell reselection, where the second frequency is a frequency of a cell providing a sidelink communication resource. The sidelink communication configuration information includes sidelink resource configuration information for the sidelink communication, that is, configuration information of a resource which can be provided for the sidelink communication, which includes configuration information of any resource such as a frequency or a symbol.

In an embodiment, the cell reselection frequency priority includes a priority of a frequency at which the sidelink communication can be provided. The sidelink communication configuration information includes the sidelink resource configuration information for the sidelink communication.

In an embodiment, the cell reselection information for implementing the service continuity of the sidelink communication includes information with which the UE that is of interest or performing the sidelink communication preferentially selects a target cell capable of providing the sidelink communication to perform the cell reselection in the case where the UE needs to perform the cell reselection. That is, to ensure the service continuity of the sidelink communication of the UE, the UE desires to preferentially reselect the target cell which can ensure the service continuity of the sidelink communication of the UE. The base station may configure, for the UE, the information with which the UE preferentially selects the target cell capable of providing the sidelink communication to perform the cell reselection.

According to the cell reselection method for sidelink communication provided by this embodiment, the base station configures the cell reselection information which includes the cell reselection information for implementing the service continuity of the sidelink communication and sends the cell reselection information. Since the cell reselection information includes the cell reselection information for implementing the service continuity of the sidelink communication, the service continuity of the sidelink communication can be ensured after the UE receives the cell reselection information and performs the cell reselection, thereby improving user experience.

Figure 6:
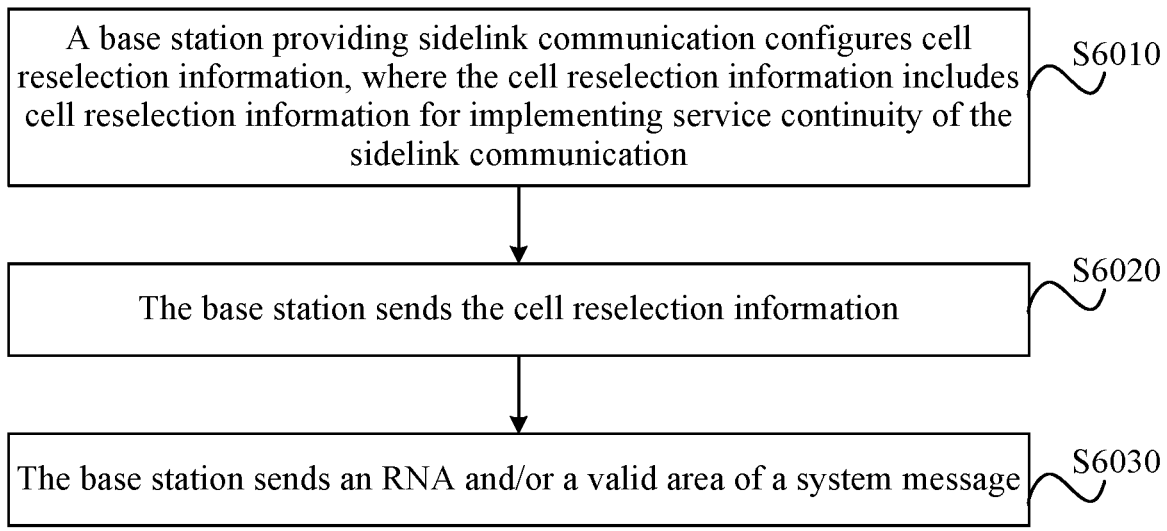
FIG. 6 is a flowchart of another cell reselection method for sidelink communication according to an embodiment.

FIG. 6 is a flowchart of another cell reselection method for sidelink communication according to an embodiment. As shown in FIG. 6, the method provided by this embodiment includes the following.

In S6010, a base station providing the sidelink communication configures cell reselection information, where the cell reselection information includes cell reselection information for implementing service continuity of the sidelink communication.

In S6020, the base station sends the cell reselection information.

In S6030, the base station sends an RNA and/or a valid area of a system message.

In the sidelink communication, the parameter RNA exists. A UE in the inactive state moves within the range of the RNA without notifying a network. Generally, one RNA is larger than or equal to one cell. In addition, the valid area of a system message is also defined in NR. The valid area of a system message includes one or more cells. When the UE moves within the same valid area of a system message, it is unnecessary to initiate a cell reselection or cell handover procedure. The UE may receive information about the RNA and/or the valid area of the system message from information broadcast by the base station. Since the UE can use an original communication resource for communication in the RNA and the valid area of the system message, after the UE performs the cell reselection, no matter whether a cell reselected by the UE has a frequency the same as or different from that of the source cell, the UE can continue using the sidelink communication resource of the source cell for the sidelink communication within the RNA and/or the valid area of the system message. In this manner, although the UE reselects a new cell, the UE may still use an original sidelink communication resource for communication so that the interruption of service of the sidelink communication can be further avoided. Therefore, the base station may send the RNA and/or the valid area of the system message.

In an embodiment, the base station may also send configuration information of an exceptional resource pool for the cell selection. After the UE receives the configuration information of the exceptional resource pool for the cell reselection, the UE performs the cell reselection according to the cell reselection information and capability information of the UE and selects a transmission resource for the sidelink communication according to the configuration information of the exceptional resource pool. The exceptional resource pool is configured for the cell reselection so that it can be ensured that a sidelink communication resource can be available for the sidelink communication after the cell reselection and the service continuity of the sidelink communication can be further ensured.

In an embodiment, the base station may also send speed-related configuration information for the cell reselection, where the speed-related configuration information indicates at least one piece of cell reselection information and corresponds to a speed of the UE performing the cell reselection. After receiving the speed-related configuration information for the cell reselection, the UE determines corresponding speed-related configuration information according to a current motion speed and performs the cell reselection according to cell reselection information indicated by the corresponding speed-related configuration information. When the UE has an excessively high speed, the UE frequently crosses multiple cells during movement. If the UE performs the cell reselection and changes a communication resource for the sidelink communication every time the UE crosses cells, the continuity of the sidelink communication performed by the UE may be affected. Therefore, the speed-related configuration information for the cell reselection may be configured. The speed-related configuration information includes different speed-related configuration information corresponding to different movement speeds of the UE. For example, the speed-related configuration information includes a range of the RNA, a range of the valid area of the system message, or other cell reselection information. Multiple thresholds may be set for the speed of the UE. For example, when the speed of the UE exceeds a certain threshold, it is determined that the speed of the UE is high. In this case, the range of the RNA or the range of the valid area of the system message may be increased or a cell reselection procedure is speeded up so that the service continuity of the sidelink communication is improved when the UE moving at the high speed performs the cell reselection. However, when the speed of the UE is lower than a certain threshold, it may be determined that the speed of the UE is low. In this case, the range of the RNA or the range of the valid area of the system message may be reduced or the cell reselection procedure is slowed down so that service reliability of the sidelink communication is improved and the consumption of system resources is reduced when the UE performs the cell reselection.

The cell reselection method for side communication provided by the embodiments of the present application is described in detail with several embodiments below. The following several embodiments are described with V2X communication as an example.

Figure 7:
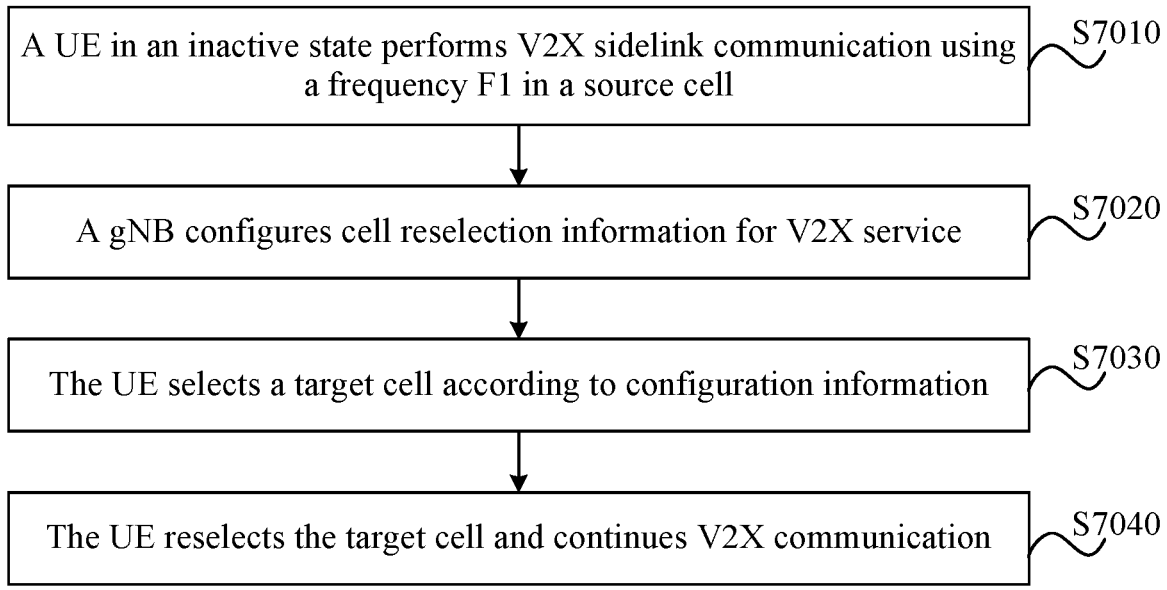
FIG. 7 is a flowchart of another cell reselection method for sidelink communication according to an embodiment.

FIG. 7 is a flowchart of another cell reselection method for sidelink communication according to an embodiment. As shown in FIG. 7, the method provided by this embodiment includes the following.

In S7010, a UE in an inactive state performs V2X sidelink communication using a frequency F1 in a source cell.

The source cell of the UE is a 5G NR cell. The frequency F1 is a V2X communication frequency in 5G NR. The frequency F1 is a licensed spectrum for uplink in 5G NR or a dedicated spectrum for V2X such as a spectrum in the 5.9 GHz band. The V2X sidelink communication is performed using an autonomously selected resource. The UE autonomously selects the resource because the UE is in the inactive state.

In S7020, a gNB configures cell reselection information for V2X service.

The cell reselection information includes configuration information for reselecting an intra-frequency/inter-frequency neighboring cell. The configuration information for reselecting the intra-frequency/inter-frequency neighboring cell includes a frequency priority, a relative priority of a frequency for reselecting NR/E-UTRA, a threshold, a reselection timer, speed-related configuration information, and the like. The frequency priority refers to an absolute frequency priority for cell reselection. The UE should select a cell having a frequency with a highest priority. The relative priority is used for indicating, together with the frequency priority, a frequency priority for the cell reselection. For example, a priority for reselecting an NR cell includes an NR frequency priority and a relative priority of NR, and a priority for reselecting E-UTRA includes an E-UTRA frequency priority and a relative priority of E-UTRA. The threshold is used for sorting neighboring cells for the cell reselection according to measurement results. The reselection timer is used for indicating when to initiate the cell reselection. A speed-related configuration is used for configuring a corresponding cell reselection parameter according to a movement speed of the UE, for example, the reselection timer and the like.

Configuration information for the cell reselection is sent to the UE through a system message and dedicated RRC signaling. In addition, parameters are updated according to a network state, a state of the UE, and the like.

In S7030, the UE selects a target cell according to the configuration information.

The UE selects the target cell according to the configuration information. Generally, the UE performs the cell reselection using F1 as the frequency with the highest priority. That is, the UE preferentially selects a cell which has the frequency F1. If multiple cells which have the frequency F1 satisfy cell reselection conditions, the UE selects a cell with a best channel condition among the multiple cells as the target cell. In addition, when performing the cell reselection, the UE should evaluate a current speed of the UE and perform the cell reselection according to a speed-related parameter. For example, when the UE moves at a high speed, a value of a timer for the cell reselection may be reduced.

In S7040, the UE reselects the target cell and continues V2X communication.

The UE reselects the target cell and maintains the inactive state or switches to an idle state or a connected state in the target cell. A specific RRC state is determined by the gNB of the target cell. To reduce the interruption time of the V2X communication, the UE reselects the target cell. The UE may randomly select a V2X sending resource from an exceptional resource pool broadcast by the target cell to perform the V2X communication. (1) If an autonomous resource selection mode is used in the target cell, after the UE completes resource sensing and selection in the target cell, the UE performs the V2X communication using an autonomously selected resource in the target cell. When a link quality of a Uu interface is degraded, the UE performs the cell reselection. In this case, however, the quality of sidelink PC5 can support the continuation of V2X communication. Particularly, when PC5 uses the dedicated spectrum for V2X for communication, the preceding situation is more likely to occur. After reselecting the target cell, the UE continues using an original sidelink resource for the V2X communication. After the UE completes resource sensing and selection in the target cell, the UE performs the V2X communication using a sensed resource in the target cell. Alternatively, the UE firstly performs the V2X communication using an original sidelink resource. After the UE completes synchronization and acquires a related V2X system message, the UE randomly selects a resource from an exceptional resource pool in the system message for the V2X communication. Finally, after the UE completes resource sensing and selection in the target cell, the UE performs the V2X communication using a sensed resource in the target cell. Alternatively, after the UE completes synchronization and acquires a related V2X system message, the UE randomly selects a resource from an exceptional resource pool in the system message for the V2X communication. After the UE completes resource sensing and selection in the target cell, the UE performs the V2X communication using a sensed resource in the target cell. (2) If a resource scheduling mode is used in the target cell, the UE randomly selects a resource from an exceptional resource pool in a system message for the V2X communication. After an RRC connection is established in the target cell and a scheduled sidelink resource is acquired via the gNB, the scheduled resource is used for the V2X communication.

It is to be noted that if the target cell and the source cell belong to the same valid area of the system message, after reselecting the target cell, the UE continues using the original sidelink resource for the V2X communication and does not need to sense a new sidelink resource in the target cell.

Figure 8:
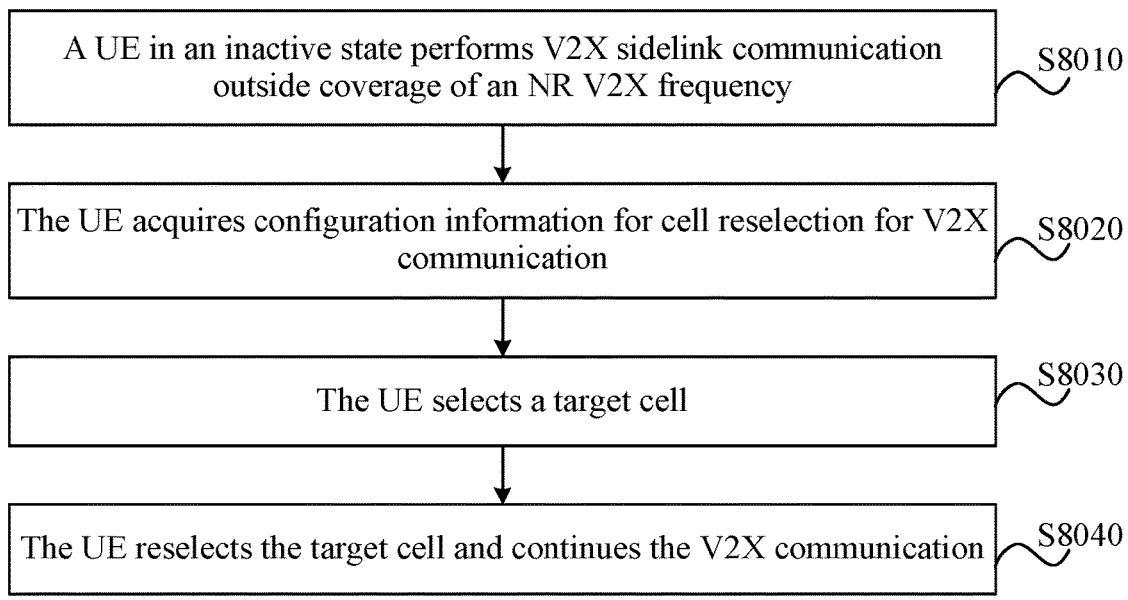
FIG. 8 is a flowchart of another cell reselection method for sidelink communication according to an embodiment.

FIG. 8 is a flowchart of another cell reselection method for sidelink communication according to an embodiment. As shown in FIG. 8, the method provided by this embodiment includes the following.

In S8010, a UE in an inactive state performs V2X sidelink communication outside coverage of an NR V2X frequency.

The UE performs V2X communication using a preconfigured V2X frequency resource outside the coverage of the NR V2X frequency. For example, the UE autonomously selects a resource from a pre-configured F2 frequency resource for the V2X communication. "Outside the coverage of the NR V2X frequency" refers to that no NR frequency is deployed for V2X service in an area where the UE is located.

In S8020, the UE acquires configuration information for cell reselection for the V2X communication.

Considering that the UE is outside the coverage, the configuration information for cell reselection may be pre-configured in the UE. The configuration information for cell reselection includes configuration information for reselecting an intra-frequency/inter-frequency neighboring cell and includes at least a frequency priority. For example, the UE uses a frequency at which the V2X service is provided as a highest priority for the cell reselection. Further, the configuration information for cell reselection further includes a relative priority of a frequency for reselecting NR/E-UTRA, a threshold, a reselection timer, speed-related configuration information, and the like.

In S8030, the UE selects a target cell.

The UE uses the frequency at which the V2X service is provided as the highest priority for reselection. If multiple neighboring cells have the same priority, the UE selects a neighboring cell having the best link quality of sidelink PC5 as the target cell.

In S8040, the UE reselects the target cell and continues the V2X communication.

The UE is in the inactive state or an idle state in the target cell. To ensure continuity of the V2X service, the UE continues using a pre-configured resource for the V2X communication in the target cell. After the UE completes resource sensing and selection in the target cell, the UE performs the V2X communication using a sensed resource in the target cell. Alternatively, the UE firstly performs the V2X communication using an original pre-configured sidelink resource. After the UE completes synchronization and acquires a related V2X system message, the UE randomly selects a resource from an exceptional resource pool in the system message for the V2X communication. Finally, after the UE completes resource sensing and selection in the target cell, the UE performs the V2X communication using a sensed resource in the target cell. Alternatively, after the UE completes synchronization and acquires a related V2X system message, the UE randomly selects a resource from an exceptional resource pool in the system message for the V2X communication. After the UE completes resource sensing and selection in the target cell, the UE performs the V2X communication using a sensed resource in the target cell.

Figure 9:
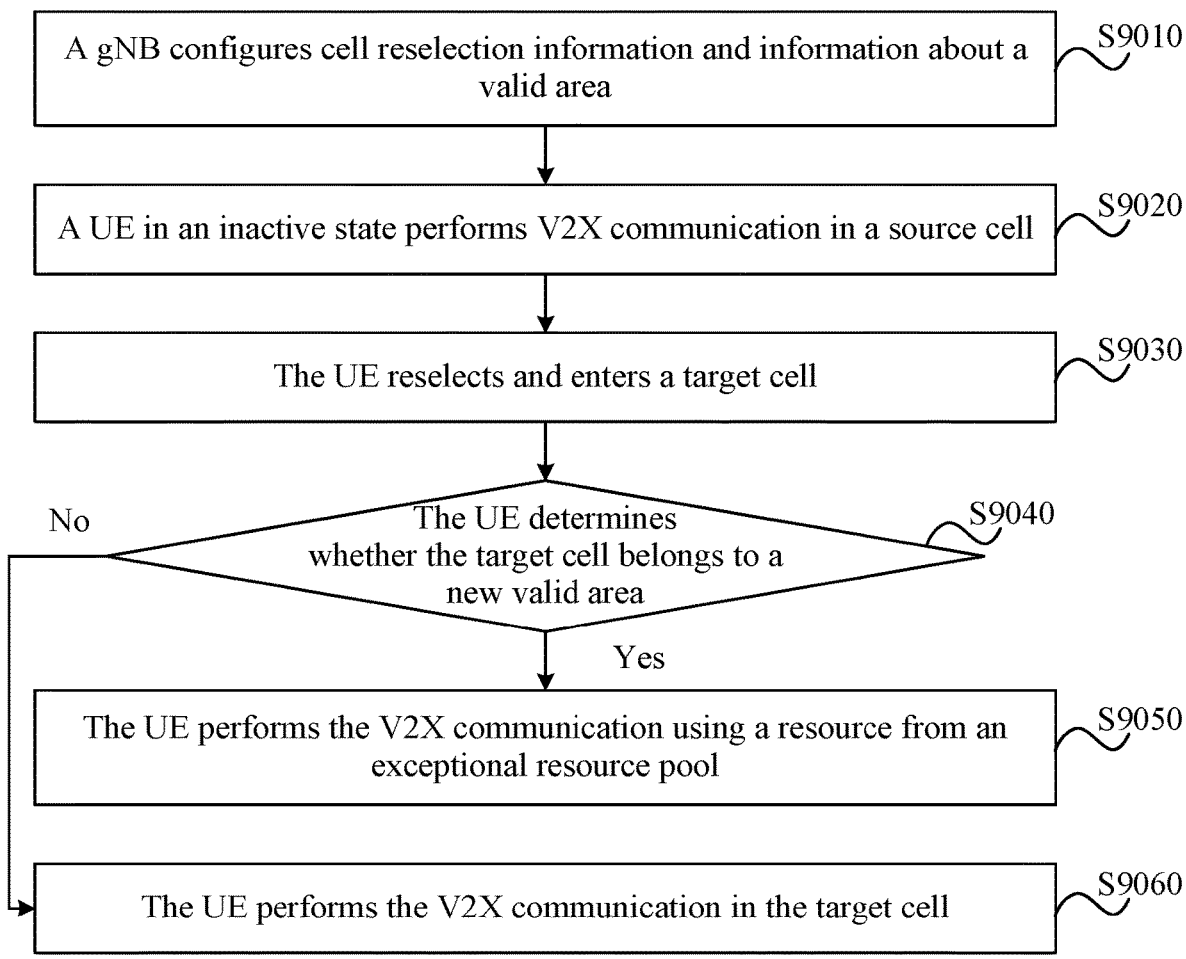
FIG. 9 is a flowchart of another cell reselection method for sidelink communication according to an embodiment.

FIG. 9 is a flowchart of another cell reselection method for sidelink communication according to an embodiment. As shown in FIG. 9, the method provided by this embodiment includes the following.

In S9010, a gNB configures cell reselection information and information about a valid area.

The valid area includes one of an RNA or a valid area of a system message.

The information about the valid area includes a list of cells, that is, cells included in the valid area. Information about a specific valid area is broadcast through a system message. A speed factor and a motion trajectory of the UE are considered for configuring the valid area. For example, when the UE has a relatively high speed, the valid area includes more cells (a size of the RNA does not exceed a size of a TA). The valid area is designed according to the motion trajectory of the UE. For example, when the UE travels on an expressway, cells along the expressway are configured as the valid area so as to reduce a frequency at which the valid area is updated.

In S9020, a UE in an inactive state performs V2X communication in a source cell.

The UE performs the V2X communication in the source cell in an autonomous resource selection mode and acquires configuration information for cell reselection through a system broadcast message.

In S9030, the UE reselects and enters a target cell.

The UE determines the target cell according to the cell reselection information. For example, the UE selects a cell which has a frequency with a highest priority and provides the V2X communication.

In S9040, the UE determines whether the target cell belongs to a new valid area. If the target cell belongs to the new valid area, S9050 is performed. If the target cell does not belong to the new valid area, S9060 is performed.

The UE determines whether the target cell belongs to the new valid area by comparing whether an identifier of a valid area in a system message of the target cell is the same as an identifier of a valid area stored in the UE. If the identifier of the valid area in the system message is different and/or an identifier of an RNA is different, it indicates that the target cell belongs to the new valid area. Otherwise, the target cell belongs to an original valid area.

In S9050, the UE performs the V2X communication using a resource from an exceptional resource pool.

The target cell belongs to the new valid area. In the target cell, the UE firstly randomly selects the resource from the exceptional resource pool for the V2X communication. The exceptional resource pool is indicated by the system message of the target cell. After the UE completes sensing of a resource pool for autonomous selection and resource selection in the target cell, the UE uses a new autonomously selected resource for the V2X communication. If the new valid area belongs to a new RNA, the UE initiates an RNA position update procedure. If a periodic update timer of the RNA expires, the UE also initiates an RNA update procedure.

In S9060, the UE performs the V2X communication in the target cell.

The UE randomly selects the resource from the exceptional resource pool of the target cell for the V2X communication. After the UE completes the sensing of the resource pool for autonomous selection and selection in the target cell, the UE uses the autonomously selected resource for the V2X communication.

Figure 10:
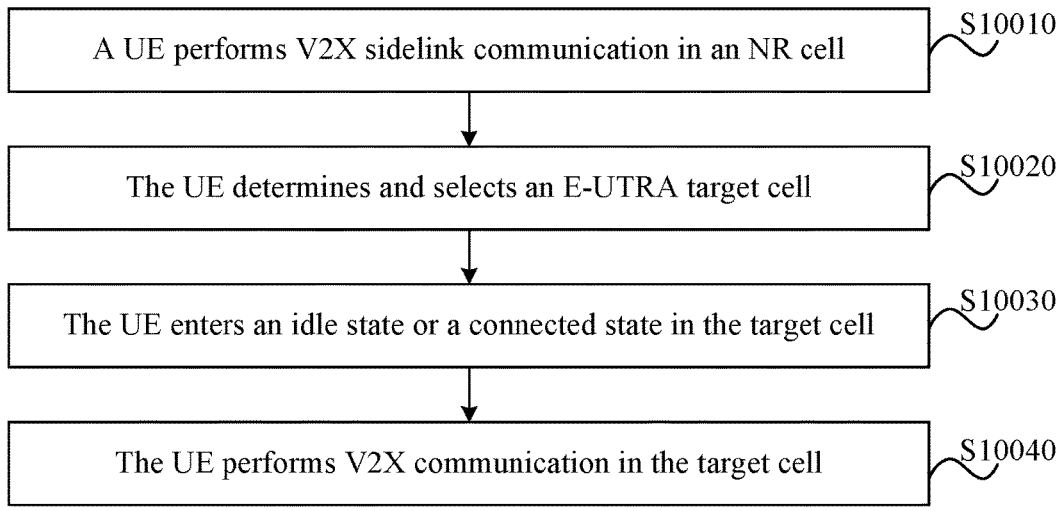
FIG. 10 is a flowchart of another cell reselection method for sidelink communication according to an embodiment.

FIG. 10 is a flowchart of another cell reselection method for sidelink communication according to an embodiment. As shown in FIG. 10, the method provided by this embodiment includes the following.

In S10010, a UE performs V2X sidelink communication in an NR cell.

The NR cell refers to a cell that uses NR frequencies and a corresponding NR communication technology. The UE is in an inactive state and autonomously selects a resource for the V2X sidelink communication.

In S10020, the UE determines and selects an E-UTRA target cell.

During cell reselection performed by the UE, no NR target cell is discovered. For example, no corresponding NR frequency (applicable to V2X communication) is available for performing cell deployment. Alternatively, the quality of the NR cell does not satisfy V2X communication conditions. However, a cell having an E-UTRA frequency exists, can provide the V2X communication, and has communication quality which satisfies requirements of V2X. The UE performs cell reselection according to a cell reselection rule in a system message and determines the E-UTRA target cell.

In S10030, the UE enters an idle state or a connected state in the target cell.

The UE may choose to enter the idle state or the connected state in the target cell, which is specifically determined according to an indication of a base station on a network side.

In S10040, the UE performs the V2X communication in the target cell.

In the E-UTRA target cell, the UE randomly selects a resource from an exceptional resource pool for the V2X communication. The exceptional resource pool is indicated by a system message of the target cell. If the UE performs the V2X communication using an autonomously selected resource in the target cell, after the UE completes resource sensing and selection in a resource pool for autonomous selection of the target cell, the UE continues the V2X communication using the autonomously selected resource. Alternatively, if the UE performs the V2X communication using a scheduled resource in the target cell, after the UE establishes an RRC connection and acquires a scheduled sidelink resource in the target cell, the UE continues the V2X communication using the scheduled resource.

Figure 11:
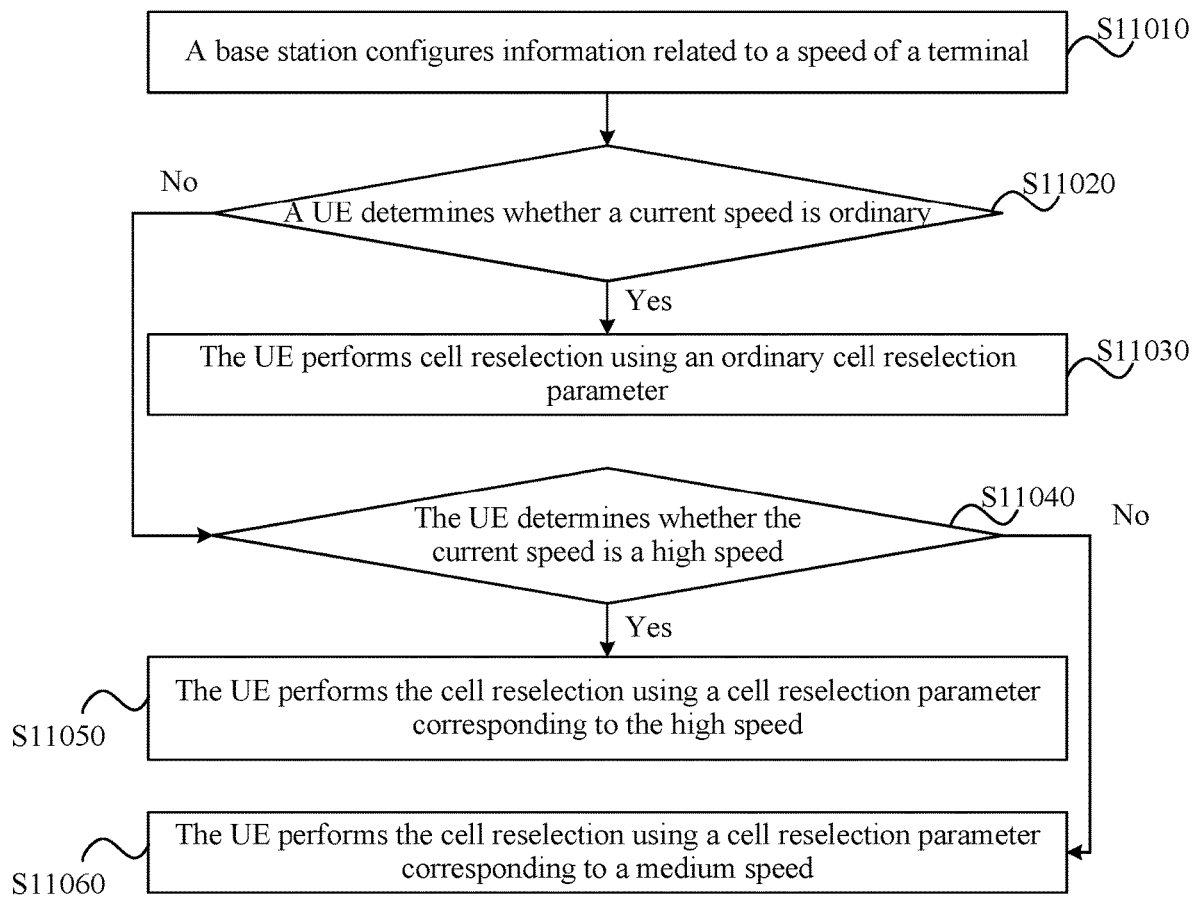
FIG. 11 is a flowchart of another cell reselection method for sidelink communication according to an embodiment.

FIG. 11 is a flowchart of another cell reselection method for sidelink communication according to an embodiment. As shown in FIG. 11, the method provided by this embodiment includes the following.

In S11010, a base station configures information related to a speed of a terminal.

Speed-related information includes one of: cell reselection information, information about a valid area of a system message, or information about an RNA. As for the cell reselection information, a current motion speed of the UE is considered. If the UE has a high/medium speed, a cell reselection parameter is changed to speed up a cell reselection procedure. The valid area of the system message may be adjusted according to a current speed of the UE. For a high-speed UE, a range of the valid area of the system message may be increased. The RNA may also be adjusted according to the speed of the UE. If the UE has a high speed, a range of the RNA may be increased.

In S11020, the UE determines whether the current speed is ordinary. If yes, S11030 is performed. Otherwise, S11040 is performed.

The UE determines whether the current speed is an ordinary speed by comparing the number of times cell reselection is initiated within a pre-determined time with a pre-configured threshold. If the threshold is not exceeded, the current speed is the ordinary speed. Otherwise, the current speed is the medium/high speed.

In S11030, the UE performs the cell reselection using an ordinary cell reselection parameter.

The UE has the ordinary speed and performs the cell reselection using a corresponding cell reselection parameter. In addition, the original configuration of the valid area of the system message and the RNA are maintained.

In S11040, the UE determines whether the current speed is the high speed. If yes, S11050 is performed. Otherwise, S11060 is performed.

If a speed index of the UE exceeds a threshold 1, the UE travels at the high speed. If the speed index of the UE is lower than the threshold 1 and higher than a threshold 2, the UE travels at the medium speed. The threshold 1 and the threshold 2 are pre-configured by a gNB separately and notified to the UE through the system message.

In S11050, the UE performs the cell reselection using a cell reselection parameter corresponding to the high speed.

Generally, the cell reselection parameter corresponding to the high speed has a shorter cell reselection timer. To avoid a ping-pong reselection effect, a corresponding hysteresis value is also reduced. The range of the valid area of the system message and the range of the RNA may be increased, that is, more cells are included.

In S11060, the UE performs the cell reselection using a cell reselection parameter corresponding to the medium speed.

The embodiments of the present application are described with the V2X service as an example. The cell reselection method for sidelink communication provided by the present application is also applicable to other types of broadcast service, for example, digital video, machine-type communication (MTC), public safety (PS) communication, mission-critical push-to-talk (MCPTT), and the like.

Figure 12:
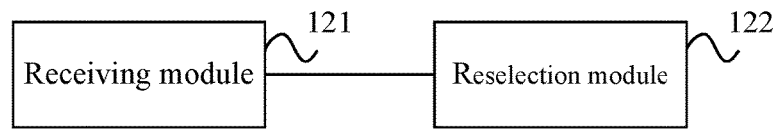
FIG. 12 is a structure diagram of a cell reselection apparatus for sidelink communication according to an embodiment.

FIG. 12 is a structure diagram of a cell reselection apparatus for sidelink communication according to an embodiment. As shown in FIG. 12, the cell reselection apparatus for sidelink communication provided by this embodiment is disposed in a UE in an inactive state and participating in the sidelink communication. The cell reselection apparatus includes a receiving module 121 and a reselection module 122.

The receiving module 121 is configured to receive cell reselection information, where the cell reselection information includes cell reselection information for implementing service continuity of the sidelink communication. The reselection module 122 is configured to perform cell reselection according to the cell reselection information and capability information of the UE.

The cell reselection apparatus for sidelink communication provided by this embodiment is used for implementing the cell reselection method for sidelink communication in the embodiment illustrated in FIG. 3. The cell reselection apparatus for sidelink communication provided by this embodiment has similar implementation principles and technical effects, which are not repeated here.

Figure 13:
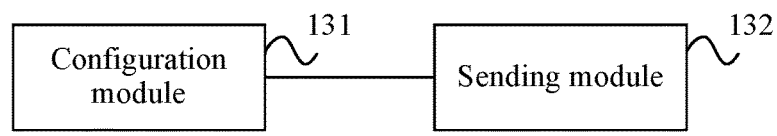
FIG. 13 is a structure diagram of another cell reselection apparatus for sidelink communication according to an embodiment.

FIG. 13 is a structure diagram of another cell reselection apparatus for sidelink communication according to an embodiment. As shown in FIG. 13, the cell reselection apparatus for sidelink communication provided by this embodiment is disposed in a base station providing the sidelink communication. The cell reselection apparatus includes a configuration module 131 and a sending module 132.

The configuration module 131 is configured to configure cell reselection information, where the cell reselection information includes cell reselection information for implementing service continuity of the sidelink communication. The sending module 132 is configured to send the cell reselection information.

The cell reselection apparatus for sidelink communication provided by this embodiment is used for implementing the cell reselection method for sidelink communication in the embodiment illustrated in FIG. 5. The cell reselection apparatus for sidelink communication provided by this embodiment has similar implementation principles and technical effects, which are not repeated here.

Figure 14:
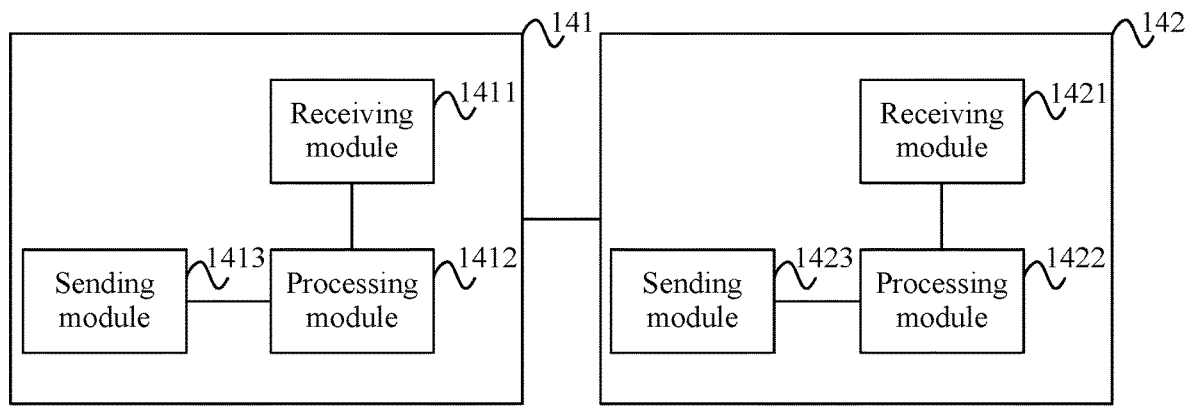
FIG. 14 is a structure diagram of a cell reselection system for sidelink communication according to an embodiment.

FIG. 14 is a structure diagram of a cell reselection system for sidelink communication according to an embodiment. As shown in FIG. 14, the cell reselection system for sidelink communication provided by this embodiment includes a UE 141 and a base station 142. The UE 141 includes a receiving module 1411, a processing module 1412, and a sending module 1413. The base station 142 includes a receiving module 1421, a processing module 1422, and a sending module 1423. The receiving module 1411 is configured to receive, through an air interface, configuration information for cell reselection and information about a valid area, which are sent by the base station 142 and the receiving module 1411 is configured to receive V2X service data sent by a peer terminal. The processing module 1412 is configured to determine a target reselection cell and select a V2X communication resource for sidelink PC5. The sending module 1413 is configured to send V2X data to the peer terminal of V2X communication and send a sidelink resource request message to the base station 142. The receiving module 1421 is responsible for receiving a V2X sidelink resource request message sent by the UE 141 at a Uu interface. The processing module 1422 is responsible for scheduling V2X service and setting the configuration information for cell reselection and the information about the valid area. The sending module 1423 is responsible for sending the configuration information for cell reselection and the information about the valid area to the UE 141 and sending V2X sidelink resource configuration information and configuration information of an exceptional resource pool to the UE 141.

The receiving module 1411 in the UE 141 is configured to implement a function of the receiving module 121. The processing module 1422 in the UE 141 is configured to implement a function of the reselection module 122. The processing module 1422 in the base station 142 is configured to implement a function of the configuration module 131. The sending module 1423 in the base station 142 is configured to implement a function of the sending module 132.

Figure 15:
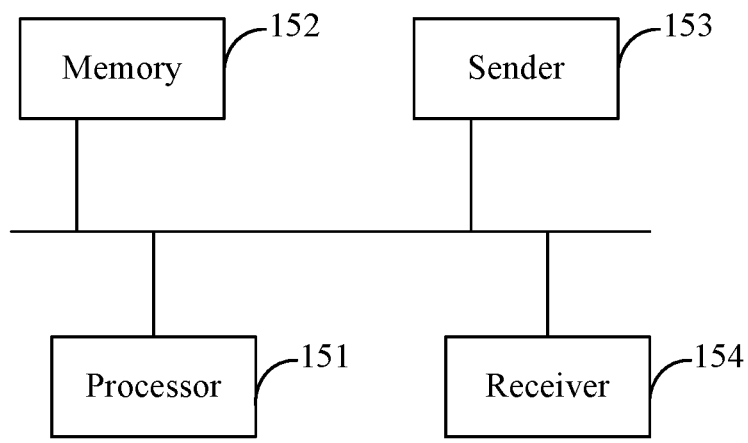
FIG. 15 is a structure diagram of a UE according to an embodiment.

FIG. 15 is a structure diagram of a UE according to an embodiment. As shown in FIG. 15, the UE includes a processor 151, a memory 152, a sender 153, and a receiver 154. The number of processors 151 in the UE may be one or more. One processor 151 is used as an example in FIG. 15. The processor 151, the memory 152, the sender 153, and the receiver 154 in the UE may be connected through a bus or in other manners. FIG. 15 illustrates an example in which the connection is implemented through the bus.

As a computer-readable storage medium, the memory 152 may be configured to store software programs, computer-executable programs and modules such as program instructions/modules corresponding to the cell reselection method for sidelink communication in the embodiment of the present application in FIG. 3 or FIG. 4 (for example, the receiving module 121 and the reselection module 122 in the cell reselection apparatus for sidelink communication). The processor 151 executes software programs, instructions, and modules stored in the memory 152 so that at least one function application and data processing of the UE is implemented, that is, the preceding cell reselection method for sidelink communication is implemented.

The memory 152 may mainly include a program storage region and a data storage region. The program storage region may store an operating system and an application program required for at least one function, and the data storage region may store data or the like created according to the use of the terminal. In addition, the memory 152 may include a high-speed random-access memory and may also include a non-volatile memory such as at least one magnetic disk memory, flash memory, or other non-volatile solid-state memory.

The sender 153 is a combination of modules or devices capable of transmitting radio frequency signals into space and includes, for example, a combination of a radio frequency transmitter, an antenna, and another device. The receiver 154 is a combination of modules or devices capable of receiving radio frequency signals from space and includes, for example, a combination of a radio frequency receiver, an antenna, and another device.

Figure 16:
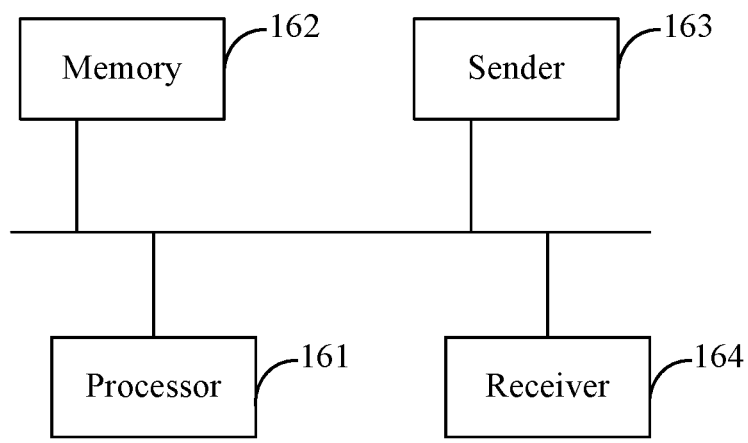
FIG. 16 is a structure diagram of a base station according to an embodiment.

FIG. 16 is a structure diagram of a base station according to an embodiment. As shown in FIG. 16, the base station includes a processor 161, a memory 162, a sender 163, and a receiver 164. The number of processors 161 in the base station may be one or more. One processor 161 is used as an example in FIG. 16. The processor 161, the memory 162, the sender 163, and the receiver 164 in the base station may be connected through a bus or in other manners. FIG. 16 illustrates an example in which the connection is implemented through the bus.

As a computer-readable storage medium, the memory 162 may be configured to store software programs, computer-executable programs and modules such as program instructions/modules corresponding to the cell reselection method for sidelink communication in the embodiment of the present application in FIG. 5 or FIG. 6 (for example, the configuration module 131 and the sending module 132 in the cell reselection apparatus for sidelink communication). The processor 161 executes software programs, instructions, and modules stored in the memory 162 so that at least one function application and data processing of the base station is implemented, that is, the preceding cell reselection method for sidelink communication is implemented.

The memory 162 may mainly include a program storage region and a data storage region. The program storage region may store an operating system and an application program required for at least one function, and the data storage region may store data or the like created according to the use of the terminal. In addition, the memory 162 may include a high-speed random-access memory and may also include a non-volatile memory such as at least one magnetic disk memory, flash memory, or other non-volatile solid-state memory.

The sender 163 is a combination of modules or devices capable of transmitting radio frequency signals into space and includes, for example, a combination of a radio frequency transmitter, an antenna, and another device. The receiver 164 is a combination of modules or devices capable of receiving radio frequency signals from space and includes, for example, a combination of a radio frequency receiver, an antenna, and another device.

An embodiment of the present application further provides a storage medium including computer-executable instructions, where the computer-executable instructions are used for performing a cell reselection method for sidelink communication when executed by a computer processor. The method includes the following. A UE in an inactive state and participating in the sidelink communication receives cell reselection information, where the cell reselection information includes cell reselection information for implementing service continuity of the sidelink communication. The UE performs cell reselection according to the cell reselection information and capability information of the UE.

An embodiment of the present application further provides a storage medium including computer-executable instructions, where the computer-executable instructions are used for performing a cell reselection method for sidelink communication when executed by a computer processor. The method includes the following. A base station providing the sidelink communication configures cell reselection information, where the cell reselection information includes cell reselection information for implementing service continuity of the sidelink communication. The base station sends the cell reselection information.

It is to be understood by those skilled in the art that the term user terminal encompasses any suitable type of wireless user device such as a mobile phone, a portable data processing device, a portable web browser, or a vehicle-mounted mobile station.

Generally, various embodiments of the present application may be implemented in hardware, a dedicated circuit, software, logics, or any combination thereof. For example, some aspects may be implemented in hardware while other aspects may be implemented in firmware or software executable by a controller, a microprocessor, or other computing devices, although the present application is not limited thereto.

The embodiments of the present application may be implemented through the execution of computer program instructions by a data processor of a mobile device, for example, implemented in a processor entity, hardware, or a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, or may represent interconnected logic circuits, modules, and functions, or may represent a combination of program steps with logic circuits, modules, and functions. Computer programs may be stored on a memory. The memory may be of any type suitable for a local technical environment and may be implemented using any suitable data storage technology such as, but not limited to, a read-only memory (ROM), a random-access memory (RAM), and an optical memory device and system (digital video disc (DVD) or compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. A cell reselection method for sidelink communication, comprising:
   receiving, by a user equipment (UE) in a non-connected state and participating in the sidelink communication, cell reselection information, wherein the cell reselection information comprises cell reselection information for implementing service continuity of the sidelink communication; and
   performing, by the UE, cell reselection according to the cell reselection information and capability information of the UE;
   wherein the cell reselection information comprises configuration information for reselecting an intra-frequency/inter-frequency neighboring cell, wherein the configuration information for reselecting the intra-frequency/inter-frequency neighboring cell comprises a reselection timer used for indicating when to initiate the cell reselection;
   wherein the method further comprises: receiving, by the UE, speed-related configuration information for the cell reselection; and
   wherein performing, by the UE, the cell reselection according to the cell reselection information and the capability information of the UE comprises:
   determining, by the UE according to a current motion speed, speed-related configuration information corresponding to the current motion speed, and performing, by the UE, the cell reselection according to cell reselection information indicated by the determined speed-related configuration information and the capability information of the UE.

2. The method according to claim 1, wherein the cell reselection information comprises a cell reselection frequency priority and sidelink communication configuration information.

3. The method according to claim 2, wherein the cell reselection frequency priority comprises a priority of a frequency at which the sidelink communication is capable of being provided, wherein the frequency is the same as or different from a frequency of a source cell of the UE, and the sidelink communication configuration information comprises sidelink resource configuration information for the sidelink communication.

4. The method according to claim 1, wherein performing, by the UE, the cell reselection according to the cell reselection information and the capability information of the UE comprises:
   selecting, by the UE that is interested in or performing the sidelink communication, a target cell capable of providing the sidelink communication.

5. The method according to claim 1, further comprising:
   in a case where the UE is not supported to perform the sidelink communication in a reselected cell, performing the sidelink communication in the reselected cell by using a pre-configured sidelink communication resource.

6. The method according to claim 1, wherein the capability information of the UE comprises:
   a capability of the UE to perform the sidelink communication on at least one of a same radio access technology (RAT) or different RATs and an RAT type that allows the UE to perform the sidelink communication.

7. The method according to claim 2, wherein performing, by the UE, the cell reselection according to the cell reselection information and the capability information of the UE comprises:
   in a case where a first frequency of a source cell of the UE is a frequency at which the sidelink communication is provided, using, by the UE, the first frequency as a highest priority for the cell reselection; and
   in a case where the UE is outside a coverage range of a cell which provides the sidelink communication, using, by the UE, a second frequency as the highest priority for the cell reselection, wherein the second frequency is a frequency of a cell which provides a sidelink communication resource.

8. The method according to claim 1, further comprising:
   receiving, by the UE, at least one of:
   a radio access network (RAN)-based notification area (RNA) or a valid area of a system message; and
   after performing, by the UE, the cell reselection according to the cell reselection information and the capability information of the UE, further comprising:
   using, by the UE, a sidelink communication resource of a source cell within at least one of the RNA or the valid area of the system message.

9. The method according to claim 1, further comprising:
   receiving, by the UE, configuration information of an exceptional resource pool for the cell reselection;
   wherein performing, by the UE, the cell reselection according to the cell reselection information and the capability information of the UE comprises:

performing, by the UE, the cell reselection according to the cell reselection information and the capability information of the UE, and selecting, by the UE, a transmission resource for the sidelink communication according to the configuration information of the exceptional resource pool.

10. A non-transitory computer-readable storage medium, which is configured to store a computer program which, when executed by a processor, implements the method of claim 1.

11. A cell reselection method for sidelink communication, comprising:
 configuring, by a base station providing the sidelink communication, cell reselection information, wherein the cell reselection information comprises cell reselection information for implementing service continuity of the sidelink communication; and
 sending, by the base station, the cell reselection information;
 wherein the cell reselection information comprises configuration information for reselecting an intra-frequency/inter-frequency neighboring cell, wherein the configuration information for reselecting the intra-frequency/inter-frequency neighboring cell comprises a reselection timer used for indicating when to initiate a cell reselection; and
 wherein the method further comprises: sending, by the base station, speed-related configuration information for the cell reselection, wherein the speed-related configuration information indicates at least one piece of cell reselection information and corresponds to a speed of a user equipment (UE) performing the cell reselection.

12. The method according to claim 11, wherein the cell reselection information comprises a cell reselection frequency priority and sidelink communication configuration information.

13. The method according to claim 12, wherein the cell reselection frequency priority comprises a priority of a frequency at which the sidelink communication is capable of being provided, wherein the frequency is the same as or different from a frequency of a source cell of a user equipment (UE), and the sidelink communication configuration information comprises sidelink resource configuration information for the sidelink communication.

14. The method according to claim 11, wherein the cell reselection information for implementing the service continuity of the sidelink communication comprises:
 information with which a user equipment (UE) that is interested in or performing the sidelink communication selects a target cell capable of providing the sidelink communication to perform cell reselection in a case where the UE needs to perform the cell reselection.

15. The method according to claim 11, further comprising:
 sending, by the base station, at least one of:
 a radio access network (RAN)-based notification area (RNA) or a valid area of a system message.

16. The method according to claim 11, further comprising:
 sending, by the base station, configuration information of an exceptional resource pool for cell reselection.

17. The method according to claim 11, further comprising:
 sending, by the base station, speed-related configuration information for cell reselection, wherein the speed-related configuration information indicates at least one piece of cell reselection information and corresponds to a speed of a UE performing the cell reselection.

18. A user equipment, comprising: a processor, a memory, a sender and a receiver, wherein the processor, the memory, the sender and the receiver are connected through a bus, the memory is configured to store computer-executable programs executed by the processor, and the processor is configured to:
 receive cell reselection information, wherein the cell reselection information comprises cell reselection information for implementing traffic continuity of sidelink communication; and
 perform cell reselection according to the cell reselection information and capability information of the user equipment;
 wherein the cell reselection information comprises configuration information for reselecting an intra-frequency/inter-frequency neighboring cell, wherein the configuration information for reselecting the intra-frequency/inter-frequency neighboring cell comprises a reselection timer used for indicating when to initiate the cell reselection;
 wherein the processor is further configured to: receive speed-related configuration information for the cell reselection; and
 wherein the processor configured to perform the cell reselection according to the cell reselection information and capability information of the user equipment is configured to:
 determine according to a current motion speed, speed-related configuration information corresponding to the current motion speed, and perform the cell reselection according to cell reselection information indicated by the determined speed-related configuration information and the capability information of the user equipment.

19. A base station, comprising: a processor, a memory, a sender and a receiver, wherein the processor, the memory, the sender and the receiver are connected through a bus, the memory is configured to store computer-executable programs, and the processor is configured to execute the computer-executable programs to implement the cell reselection method for sidelink communication of claim 11.

* * * * *